W. A. GREAVES.
SPEED CHANGING DEVICE.
APPLICATION FILED MAR. 31, 1909.
952,037.
Patented Mar. 15, 1910.
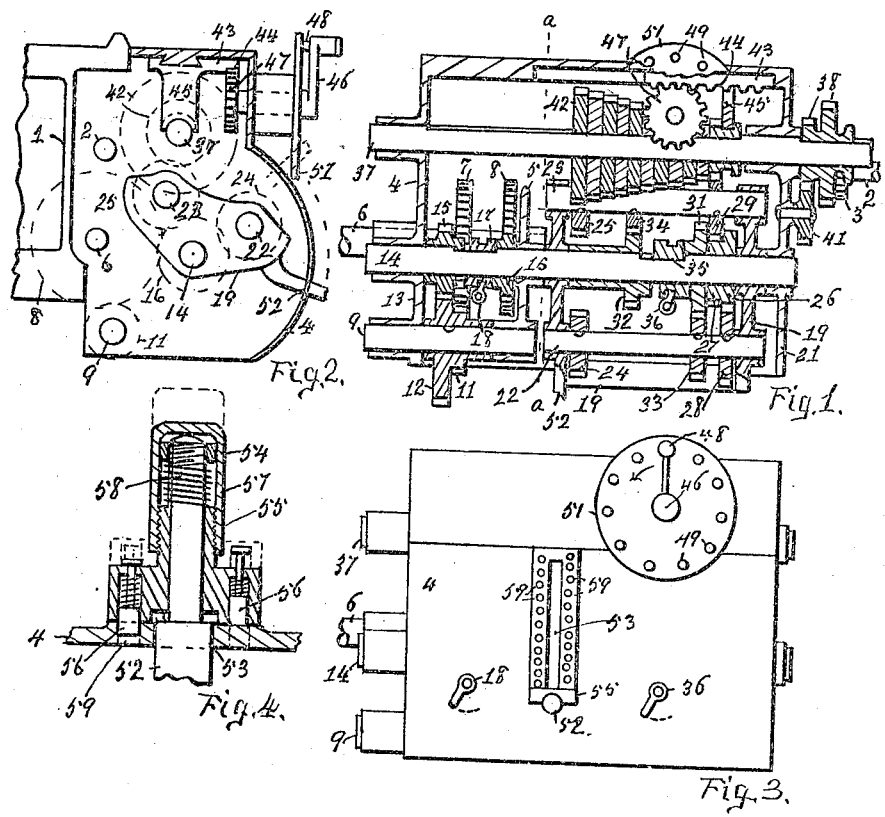

UNITED STATES PATENT OFFICE.

WILLIAM A. GREAVES, OF CINCINNATI, OHIO, ASSIGNOR TO GREAVES, KLUSMAN & COMPANY, OF CINCINNATI, OHIO, A COPARTNERSHIP.

SPEED-CHANGING DEVICE.

952,037.

Specification of Letters Patent. Patented Mar. 15, 1910.

Application filed March 31, 1909. Serial No. 486,881.

*To all whom it may concern:*

Be it known that I, WILLIAM A. GREAVES, a citizen of the United States, residing at Cincinnati, Ohio, have invented a new and useful Improvement in Speed-Changing Devices, of which the following is a specification.

My invention relates to speed changing devices of the class adapted to be used on engine lathes or elsewhere, and the objects of my improvements are to provide novel gear connections for changing speeds quickly and by the movement of a single lever; to provide a large number of speed changes from a few moving parts; to provide a lever of novel construction for moving and automatically maintaining the connected parts in predetermined positions, and to provide such construction and assemblage of parts as to secure durability, simplicity, facility of operation and efficiency of action. These objects are attained in the following described manner as illustrated in the accompanying drawings, in which:—

Figure 1 is a diagrammatic view of a speed changing device embodying my improvements; Fig. 2, a transverse section on the line *a—a* of Fig. 1; Fig. 3, a front elevation of the casing; and Fig. 4, a detail in section of the shifting lever.

In the drawings, 1 represents portions of the bed of an engine lathe, 2 the lead screw provided with a gear 3. A casing 4 having a transverse partition 5 may be secured to the lathe bed in any desired manner. A driving shaft 6 provided with similar driving gears 7 and 8 and a short shaft 9 provided with intermediate gears 11 and 12 are journaled parallel with each other in partition 5 and end wall 13 with the gear 7 in continuous engagement with gear 11.

A shaft 14 journaled in the end walls of the casing is provided with loose clutch faced gears 15 and 16 in continuous engagement respectively with gears 12 and 8. A clutch member 17 splined on shaft 14 between gears 15 and 16 thereon is movable alternately into engagement with said gears by means of the shifter 18, in the usual manner, for changing the speed of the shaft 14 in relation to that of shaft 6. A rocking frame 19 is loosely mounted on shaft 14 between partition 5 and the end wall 21 of the casing. Shafts 22 and 23 journaled in said frame parallel to and on opposite sides of shaft 14 are respectively provided with similar gears 24 and 25. Different sized gears 26 and 27 secured together and loose on shaft 14 continuously engage with the corresponding gears 28 and 29 secured on the respective shafts 22 and 23, for driving said shafts at different speeds.

Different sized clutch face gears 31 and 32 mounted on shaft 14 are in continuous engagement with the corresponding gears 33 and 34 secured on the respective shafts 22 and 23. A clutch member 35 splined on shaft 14 between the gears 31 and 32 thereon may be alternately engaged therewith by means of an ordinary shifter 36 for driving the shafts 22 and 23 at respective different speeds and at different speeds also from that secured by the engagement of gears 26 and 27 with gears 28 and 29.

A shaft 37 journaled in the end walls of the casing is provided with one or more gears 38 adapted to communicate with the lead screw 2 through idle gear 41 in the usual manner. A cone of gears 42 splined on shaft 37 is movable longitudinally thereon by means of a sliding shifter 43 which is provided with a rack 44 and with a shifting finger 45 movably engaging with said cone 42 in the usual manner. A crank shaft 46 journaled in the face of the casing is provided with a pinion 47 in engagement with said rack and with a pull pin 48 adapted to engage successively with the holes 49 formed in a stationary disk 51 for locking the crank shaft with the cone gears 42 in successive registration with gears 24 and 25. A handle 52 projects from the rocking frame 19 through a slot 53 formed in the front wall of the casing and is provided with an adjustable nut 54. A member 55 splined on said handle is provided on opposite sides thereof with spring actuated locking pins 56 and with an adjustable thimble or cap 57. A spring 58 within said cap serves to yieldingly maintain member 55 in contact with the face of the casing. A series of holes 59 corresponding to the number of gears in the cone 37 are formed in the casing on each side of the slot 53 therein. The holes of one series being opposite the spaces between the holes in the other series for the alternate engagement of the locking pins 56 therewith, when one of said pins is engaged with the corresponding hole of one series, the other pin is yieldingly maintained in contact with the opposite space of the other series and the member 55 is yieldingly maintained in contact with the face of the casing under the exertion of spring 58.

In operation, by means of the rack and pinion shifter, the cone may be moved and maintained with either of the gears thereon in registration with the gears 24 and 25 on the rocking frame. By means of the handle thereon the rocking frame may be moved and maintained with either of said gears 24 or 25 thereon in engagement with the same corresponding gear of the cone 42 for driving the cone at different speeds. The speed of gears 24 and 25 together with that of the cone 42 may be changed by means of the separate engagement of the clutch member 35 with the gears 31 and 32. The speed of shaft 14 with its connections and the cone may also be changed by means of the independent engagement of clutch member 17 with the gears 15 and 16.

It is evident that a very great number of speed changes may be secured by the compact arrangement of the gears and connections above described.

Having fully described my improvements, what I claim as my invention and desire to secure by Letters Patent of the United States is:

1. In combination, a driven shaft, a rocking frame thereon, a shaft carried by said frame, a gear secured thereon, a cone of gears movable longitudinally with either of its gears into registration with said gear, means for maintaining said frame with said gear in engagement with either of the cone gears, and change speed gear connections between the shafts.

2. A speed changing device comprising a shaft, a cone of gears splined thereon, a driven shaft, a rocking frame thereon, parallel shafts carried by said frame, gears secured on the respective parallel shafts, and adapted to be alternately engaged with either gear of the cone, change speed gear connections between the driven and the parallel shafts for driving them simultaneously at respective different speeds, and means for maintaining the frame with either of the gears on the respective parallel shafts in engagement with either of the gears of the cone.

3. A speed changing device comprising a casing, a cone of gears movable longitudinally therein, a driven shaft journaled in the casing, a rocking frame thereon, gears on the frame and movable thereby alternately into engagement with a gear of the cone of gears in registration therewith, change speed gear connections between the driven shaft and said gears, and spring actuated mechanism for automatically locking the frame in different predetermined positions.

4. A speed changing device comprising a casing, a rocking frame therein provided with a handle, a member splined on the handle, a spring actuated pin therein adapted to automatically engage with different holes formed in the casing, and a spring arranged to yieldingly maintain said member in contact with the casing.

5. A speed changing device comprising a casing formed with a slot and with a series of holes on opposite sides thereof, a rocking member within the casing and provided with a handle extending through the slot, a spring actuated member splined on the handle, and spring actuated pins therein movable alternately into engagement with corresponding holes in the respective series of holes in the casing.

6. A speed changing device comprising a fixed member provided with a double series of holes, and a spring actuated movable member having locking pins yieldingly secured therein for alternately engaging with corresponding holes of the respective series of holes.

WILLIAM A. GREAVES.

Witnesses:
R. S. CARR,
H. H. KLUOMAN.